United States Patent
Ando

(10) Patent No.: US 6,347,015 B2
(45) Date of Patent: Feb. 12, 2002

(54) OPTICAL PICKUP DEVICE

(75) Inventor: Nobuhiko Ando, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/824,038

(22) Filed: Apr. 3, 2001

Related U.S. Application Data

(62) Division of application No. 09/214,255, filed on Apr. 15, 1999, now Pat. No. 6,252,686, which is a continuation of application No. PCT/JP98/02036, filed on May 7, 1998.

(30) Foreign Application Priority Data

May 7, 1997 (JP) .......................................... 09-117187

(51) Int. Cl.[7] .............................................. G02B 3/02
(52) U.S. Cl. ...................................... 359/719; 369/112
(58) Field of Search .............................. 359/708, 710, 359/719; 369/112

(56) References Cited

U.S. PATENT DOCUMENTS 5,572,367 A * 11/1996 Jung et al. ................... 359/708
6,088,170 A * 7/2000 Lee et al. .................... 369/112

FOREIGN PATENT DOCUMENTS

JP 06-274931 * 9/1994

* cited by examiner

Primary Examiner—Darren Schuberg
(74) Attorney, Agent, or Firm—Oblon, Spivak, McClelland, Maier & Neustadt, P.C.

(57) ABSTRACT

An optical pickup device in which a light beam radiated from a semiconductor laser element is converted by a collimator lens into collimated light beam which is converged by an objective lens so as to be illuminated on an optical disc. A beam shaping element having a hologram pattern on its incident surface and/or its radiating surface is provided on a divergent optical path of the radiated light beam from the semiconductor laser element between the semiconductor laser element and the collimator lens for shaping the light beam radiated from the semiconductor laser element for forming a beam spot of an optimum shape on the optical disc.

2 Claims, 13 Drawing Sheets

YZ PLANE

LIGHT BEAM
INTENSITY DISTRIBUTION

XZ PLANE

YZ PLANE

XZ PLANE

YZ PLANE

XZ PLANE

YZ PLANE

XZ PLANE

YZ PLANE

OPTICAL PICKUP DEVICE

This application is a Division of application Ser. No. 09/214,255 now U.S. Pat. No. 6,252,686, Filed on Apr. 15, 1999, which is a continuation of PCT/JP98102036, filed May 7, 1998 Which was not published in English.

TECHNICAL FIELD

This invention relates to an optical pickup device employing a semiconductor laser element as a light source for radiating a light beam. More particularly, it relates to an optical pickup device configured for shaping a light beam for reducing the beam spot of the light beam radiated from the semiconductor laser device so as to be converged on the recording medium.

BACKGROUND ART

Up to now, attempts have been made to elevate the recording density of, for example, an optical disc, used as a recording medium for a disc-shaped recording medium for the audio information or the picture information, by a recording/reproducing apparatus used for recording data processed by the computer system. For elevating the density of this sort of the recording medium, the recording track formed on the recording medium for recording information signals is reduced in pitch, and the recording pit is also reduced in size, for elevating the recording density per unit area.

For recording and/or reproducing the information signals for an optical disc improved in the recording density, it is required to use an optical pickup device capable of reducing the spot size of the light beam illuminated on the optical disc.

The optical pickup device for illuminating a converged light beam on an optical disc employs a semiconductor laser element as a light source and shapes the light beam radiated by this semiconductor laser element by an optical component to split the light beam into plural light beam portions which are condensed on the optical disc. This optical pickup device includes a photodetector for detecting a return light beam reflected from the optical disc and detects the return light beam by this photodetector to detect the information signals recorded on the optical disc in order to reproduce the information. The optical pickup causes the light beam radiated from the semiconductor laser element to be converged and illuminated as fine-sized beam spot on the optical disc.

The beam spot diameter of the light beam illuminated on an optical disc is given by the wavelength $\lambda$ of the light beam and the numerical aperture NA of an objective lens of the optical pickup device configured for condensing the light beam on the optical disc. Specifically, the beam spot diameter of the light beam illuminated on the optical disc is given by $\lambda/NA$. Therefore, if the wavelength $\lambda$ of the light beam used is constant, it is necessary to increase the numerical aperture NA of the objective lens used for converging the light beam.

Meanwhile, in a light beam radiated from a semiconductor laser element used as a light source of the optical pickup device, there is produced a change in the radiation angle between the TE direction (direction of the electrical field) and the TM direction (direction of the magnetic field). That is, the radiation angle of the light beam radiated from the semiconductor laser element is not uniform when seen from the light-emitting point, and differs from one light beam radiated from each light emitting point to another. If the light beams having different radiation angles are converged by the objective lens to form a beam spot on the optical disc, the beam spot formed on the optical disc becomes elliptically-shaped or is not converged to a desired size but is increased in spot diameter because the radiation angle of the light beam radiated from each light-emitting point is not constant.

For overcoming these inconveniences, there is mounted a beam shaping element on the light path of the light beam radiated from the semiconductor laser element for enlarging or narrowing the light beam radiated from the semiconductor laser element in one direction.

As the beam shaping element, a lens termed an anamorphic lens is usually employed. If this anamorphic lens is placed on a divergent light path of the light beam radiated from the semiconductor laser element, there is produced aberration, such as astigmatic aberration or coma aberration. It is therefore necessary to provide the anamorphic lens in the light path of the light beam collimated by, for example, a collimator lens. That is, in the optical pickup device employing the anamorphic lens as the beam shaping element used for shaping the light beam, it is necessary to provide a collimator lens for collimating the light beam radiated as a divergent light beam from the semiconductor laser element. Thus, not only can the optical path length from the semiconductor laser element to the anamorphic lens not be reduced, but also it is difficult to reduce the size of the device.

For shaping the shape of the beam spot formed on the optical disc, there is proposed an optical pickup device in which a cylindrical lens is arranged on the optical path of the light beam radiated from the semiconductor laser element and in which a plan-parallel glass plate is arranged at a pre-set angle relative to the optical axis of the light beam. With this optical pickup device, it is difficult to remove completely the aberration in the beam spot of the light spot converged on the optical disc.

DISCLOSURE OF THE INVENTION

It is an object of the present invention to provide an optical pickup device whereby the information signals recorded on an optical disc designed for high density recording of information signals can be read out correctly.

It is another object of the present invention to provide an optical pickup device whereby the light beam radiated from the semiconductor laser element can be shaped without producing aberration in the light beam to enable the light beam to be converged with a fine-sized beam spot on the optical disc.

It is yet another object of the present invention to provide an optical pickup device whereby the optical path length for the light beam from the semiconductor laser element radiating the light beam to an objective lens converging the light beam to illuminate the converged light beam on the optical disc can be reduced to enable the device itself to be reduced in size.

For accomplishing the above object, an optical pickup device according to the present invention includes a beam shaping element arranged on a divergent optical path of a light beam radiated from a semiconductor laser element. By this beam shaping element, the light beam is shaped to fall on the objective lens. In this manner, the light beam is shaped without producing aberration and is converged highly accurately so as to be illuminated on the optical disc.

The beam shaping element has an incident surface and an outgoing surface at least one of which carries a hologram pattern.

Alternatively, the beam shaping element is flat-plate-shaped and has a hologram pattern and a cylindrical lens unit on one of the incident surface and the outgoing surface and on the other of the incident surface and the outgoing surface, respectively.

An optical pickup device according to the present invention includes a semiconductor laser element, a collimator lens for collimating a light beam radiated from the semiconductor laser element, an objective lens for converging the collimated light from the collimator lens and beam shaping means arranged on a divergent optical path of a light beam radiated from the semiconductor laser element on a light path between the semiconductor laser element and the collimator lens.

With this optical pickup device, a beam splitter is arranged between the beam shaping element and the collimator lens. The beam splitter separates the light beam radiated from the semiconductor laser element from the light beam incident via the objective lens.

Other objects and advantages of the present invention will become more apparent from the following description.

BEST MODE FOR CARRYING OUT THE INVENTION

An optical pickup device according to the present invention is hereinafter explained with reference to the drawings.

Figure 1:
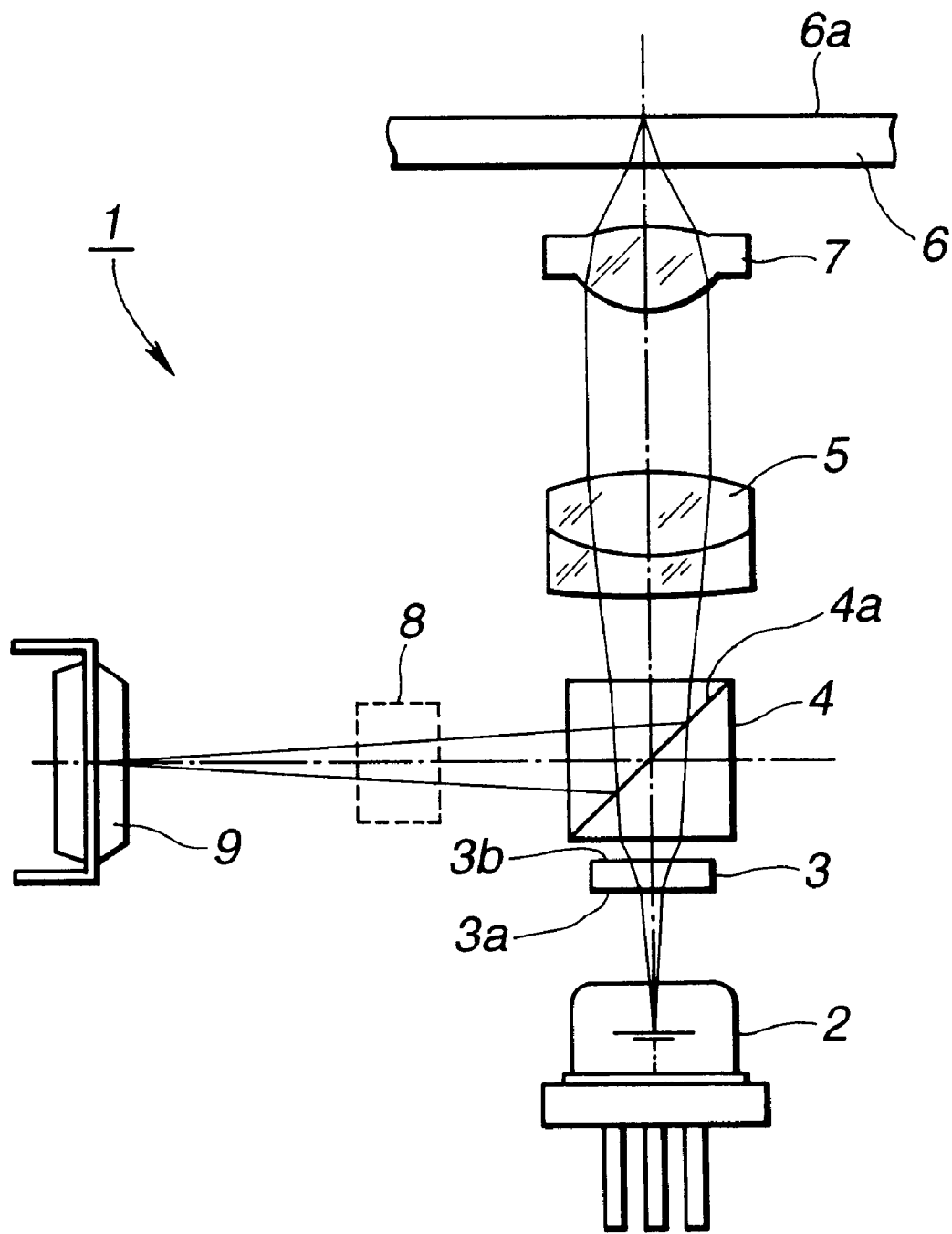
FIG. 1 is a side view showing an example of an optical pickup device according to the present invention.

The optical pickup device 1 includes, as a light source, a semiconductor laser element 2, as shown in FIG. 1. The semiconductor laser element 2 radiates a light beam as a divergent light beam radiated at a pre-set radiation angle from an oscillation area.

The optical pickup device 1, having the semiconductor laser element 2, includes a beam shaping element 3, a beam splitter 4, a collimator lens 5 and an objective lens 7, in this order, looking from the side of the semiconductor laser element 2 radiating the light beam.

The beam shaping element 3 is arranged on an optical path of the divergent light radiated from the semiconductor laser element 2, because the beam shaping element is arranged between the semiconductor laser element 2 and the beam splitter 4.

The light beam radiated from the semiconductor laser element 2 is transmitted through the beam shaping element 3 to fall on the beam splitter 4. The light beam transmitted through the beam splitter 4 is collimated by a collimator lens 5 to fall on the objective lens 7 so as to be thereby converged and illuminated on a signal recording surface 6a of an optical disc 6.

The light beam illuminated on the signal recording surface 6a of the optical disc 6 is reflected by the signal recording surface 6a to fall on the objective lens 7. The return light beam from the objective lens 7 is transmitted through the objective lens 7 and the collimator lens 5 and subsequently falls on the beam splitter 4 so that it has its optical axis bent 90° by a polarizing film 4a provided on the beam splitter 4. The beam splitter 4 permits the light beam radiated from the semiconductor laser element 2 to be transmitted therethrough, while bending the optical axis of the light beam reflected by the signal recording surface 6a of the optical disc 6 by 90°. Thus, the beam splitter 4 operates as an optical element for separating the light beam reflected by the semiconductor laser element 2 from the light reflected from the signal recording surface 6a of the optical disc 6.

The return light beam from the optical disc 6, having its optical axis bent 90° by the light polarizing film 4a of the beam splitter 4, falls on an optical analyzer 8 which plane-polarizes this light beam. The light beam, plane-polarized by the optical analyzer 8, is incident on a photodetector 9 whereby it is detected. The photodetector 9 is designed as, for example, a four-segment detector, and detects the focusing error based on detection outputs of the detector segments.

Figure 2:
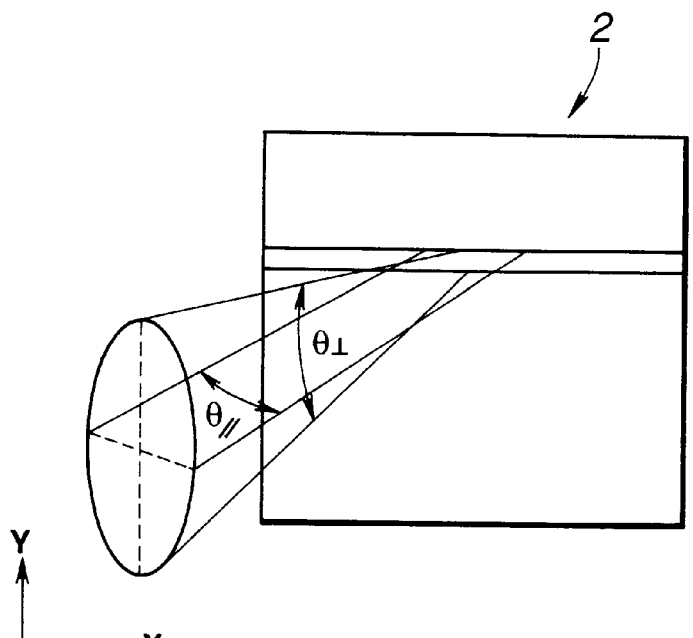
FIG. 2 shows the state of a light beam radiated from the semiconductor laser element.
Figure 4:
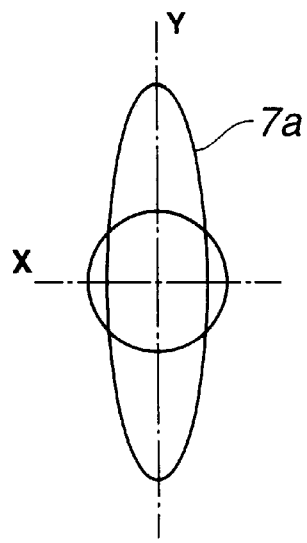
FIG. 4 illustrates the state of the light beam condensed in an aperture of an objective lens.

Meanwhile, the light beam radiated by the semiconductor laser element 2 used in this optical pickup device 1 exhibits difference in spreading of the radiation angles θ⊥ and θ// in the TE direction (direction of the electrical field) and in that in the TM direction (direction of the magnetic field), such that it is radiated in the form of an ellipsis from the objective lens 7, as shown in FIG. 2. Specifically, the light beam is radiated by a radiation angle θ⊥ to undergo spreading in the Y-direction, while being radiated by a radiation angle θ// to undergo spreading in the X-direction, as a result of which the light intensity of the light radiated by the semiconductor laser element 2 is distributed with a Gauss distribution centered about the optical axis. This light beam undergoes differential spreading in the X- and Y-directions due to the radiation angle θ of the semiconductor laser element 2, with the spreading in the Y-direction being larger than that in the X-direction. Of this light beam, the portion having a light intensity not less than $1/e^2$ representing the lowest point usable as a spot is incident at a lens aperture 7a of the objective lens 7, as shown in FIG. 4, thus forming a spot on the optical disc 6.

The beam shaping element 3, arranged on the divergent light path of the light beam radiated as the divergent light from the semiconductor laser element 2, shapes the light beam radiated from the semiconductor laser element 2 such that the light beam radiated on the signal recording surface 6a of the optical disc 6 is converged to high precision by the objective lens 7 to form a beam spot of a true circular shape.

Figure 5:
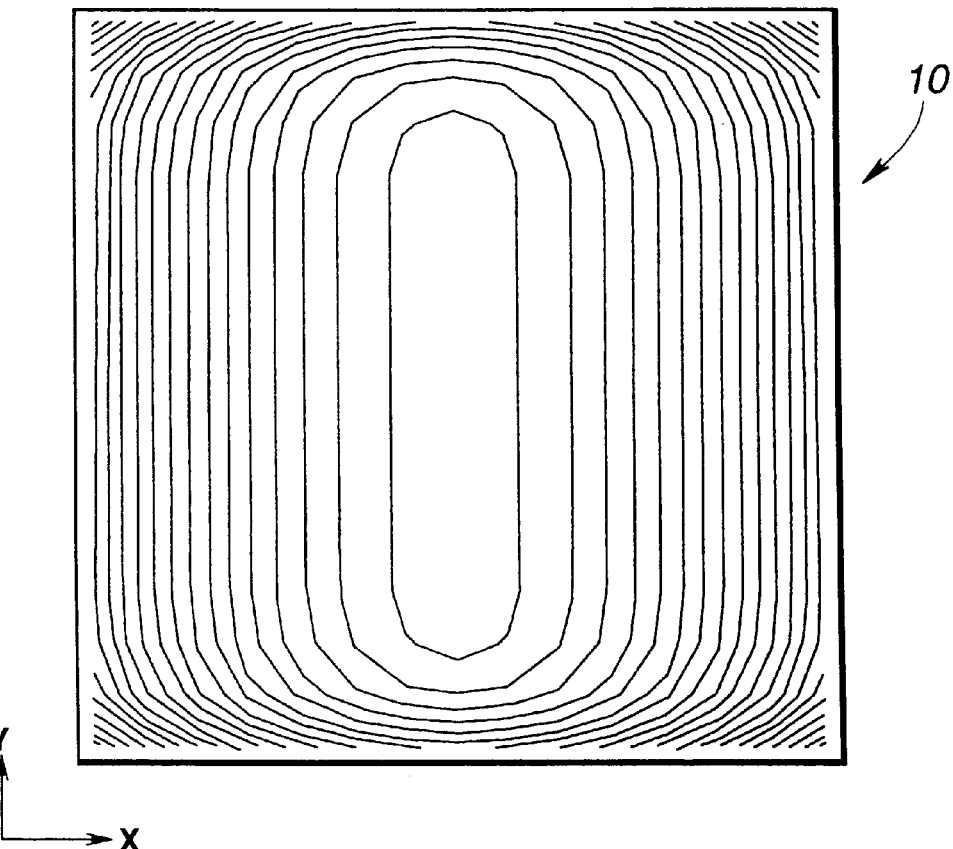
FIG. 5 is a plan view showing an example of a hologram pattern formed on a beam shaping element.

The beam shaping element 3 forms a hologram pattern 10 on an incident surface 3a on which the light beam radiated from the semiconductor laser element 2 is incident and a radiating surface 3b from which the light beam is radiated. The hologram pattern 10 is formed so as to be symmetrical in both the Y and X directions in the XY plane which is the surface perpendicular to the Z-direction of the light beam radiated from the semiconductor laser element 2, as shown in FIG. 5. Preferably, the hologram pattern 10 is inclined from the incident surface 3a or the radiating surface 3b by a pre-set angle to form grooves of a lattice having a smooth planar surface, by way of blazing, for maximizing the diffraction efficiency of the first-order light of the light beam incident on the beam shaping element 3. With the beam shaping element 3, having the hologram pattern 10 formed on both the incident surface 3a and the radiating surface 3b of the light beam, it is possible not only to shape the light beam but also to remove astigmatic aberration of the light beam radiated from the semiconductor laser element 2.

Figure 6A:
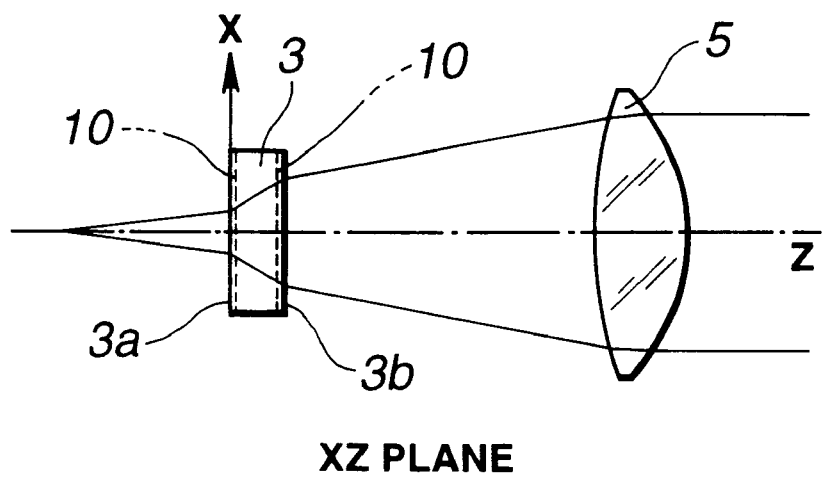
FIG. 6a is a schematic side view showing, on an XZ plane, how the light beam traverses the beam shaping element constituting an optical pickup device according to the present invention.
Figure 6B:
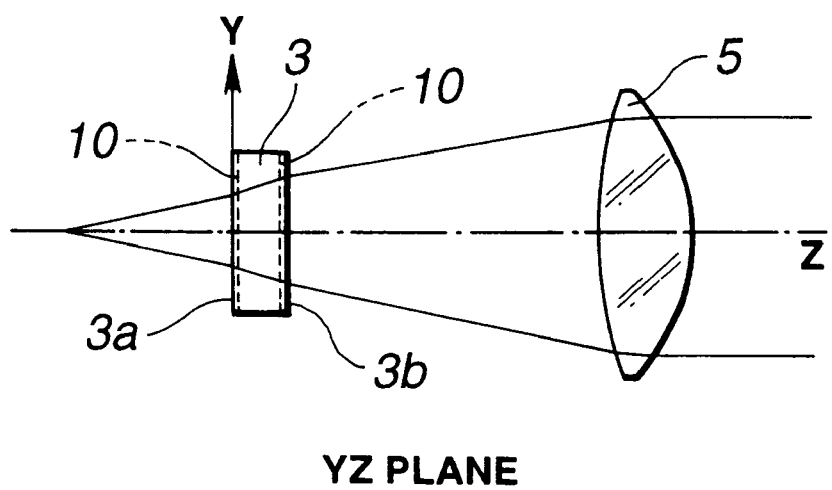
FIG. 6b is a schematic side view showing, on a YZ plane, how the light beam traverses the beam shaping element constituting an optical pickup device according to the present invention.
Figure 7:
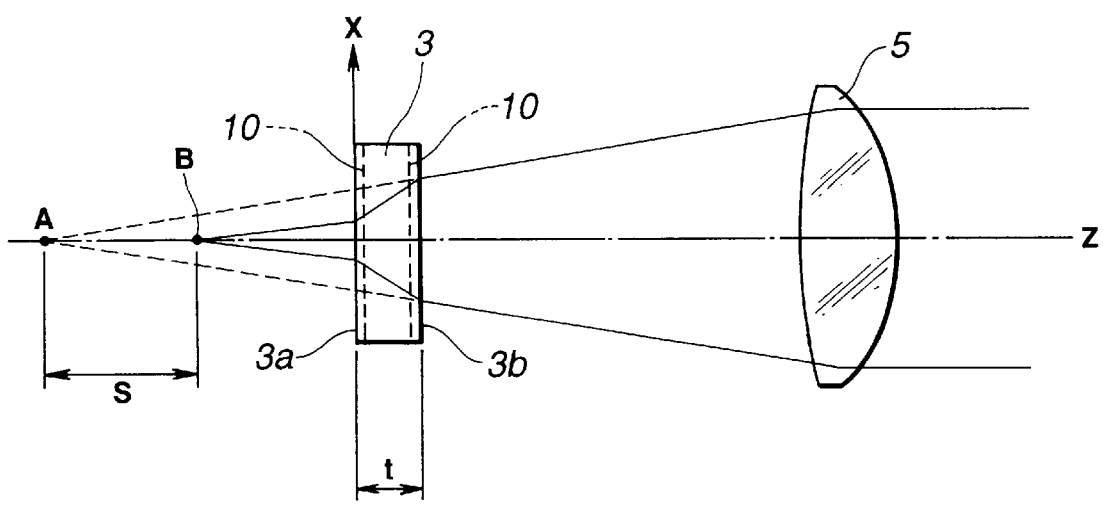
FIG. 7 is a schematic side view showing, on the XZ plane, how the light beam traverses the beam shaping element constituting an optical pickup device according to the present invention.

The beam shaping element 3, having the hologram pattern 10 formed on each of the incident surface 3a and the radiating surface 3b, spreads the light beam incident from the incident surface 3a in the X-direction, as shown in FIG. 6a. That is, the light beam incident from the incident surface 3a is enlarged in diameter when transmitted through the beam shaping element 3, and is radiated form the radiating surface 3b. The beam shaping element 3, each of the incident surface 3a and the radiating surface 3b of which carries the hologram pattern 10, is higher in diffraction efficiency than the beam shaping element only one surface of which carries the hologram pattern 10. Meanwhile, the light beam is not spread by this beam shaping element 3 in the YZ plane, as shown in FIG. 6b.

In view of the diffraction efficiency, only one of the incident surface 3a on which falls the light beam radiated from the semiconductor laser element 2 and the radiating surface 3b radiating this light beam may be provided with the hologram pattern 10.

Preferably, the beam shaping element 3 of this optical pickup device 1 is designed so that, with the thickness t in the XZ plane and the refractive index n of the beam shaping element 3, the separation S between an object point A and an image point B is given by $$S = t(1 - 1/n) \quad (1)$$

By designing the beam shaping element 3 in this manner, the light beam can be correctly collimated after passing through the collimator lens 5. It is noted that the collimator lens 5 is designed to correct the spherical aberration of the light beam produced in the YZ plane by the beam shaping element 3.

On the other hand, the beam shaping element 3 is preferably designed so as to satisfy the condition shown in the above equation (1) and so as not to produce the spherical aberration of the light beam transmitted through the collimator lens 5. Since the collimator lens 5 is formed so as to correct the spherical aberration for the XZ plane, the beam shaping element 3 is formed so that the radiated light beam undergoes spherical aberration to be corrected by the collimator lens 5 even in the XZ-plane.

The optical pickup device 1 provided with the beam shaping element 3 according to a modification is explained. For removing the astigmatic aberration, there is provided a cylindrical lens unit 13 on the side of the incident surface 3a of the beam shaping element 3 shown in FIG. 8. The hologram pattern 10 is formed on the side of the radiating surface 3b of the beam shaping element 3. Meanwhile, the cylindrical lens unit 13 is formed as-one with the beam shaping element 3 so as to be swollen out from the side of the i3a towards the radiating surface 3b of the beam shaping element 3, by forming a cylindrical recess in the incident surface 3a.

Figure 8A:
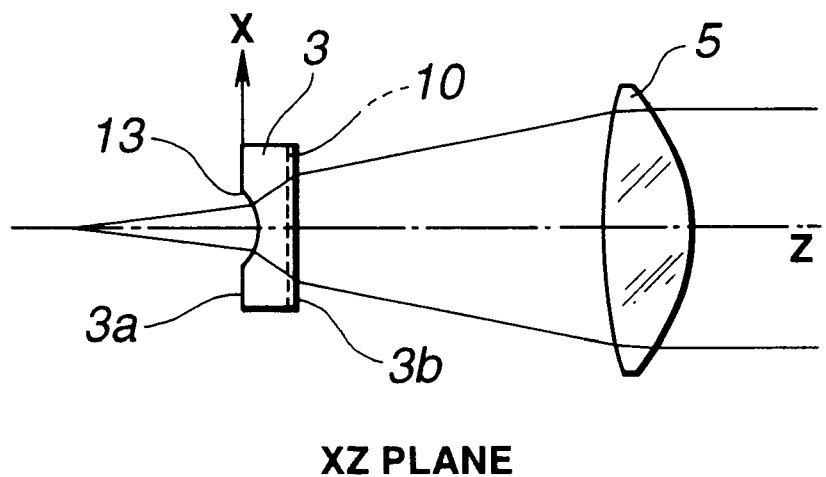
FIG. 8a schematic side view showing, on the XZ plane, how a light beam traverses a beam shaping element according to a modification, and FIG. 8b schematic side view showing, on the YZ plane, how a light beam traverses the beam shaping element according to the modification.
Figure 8B:
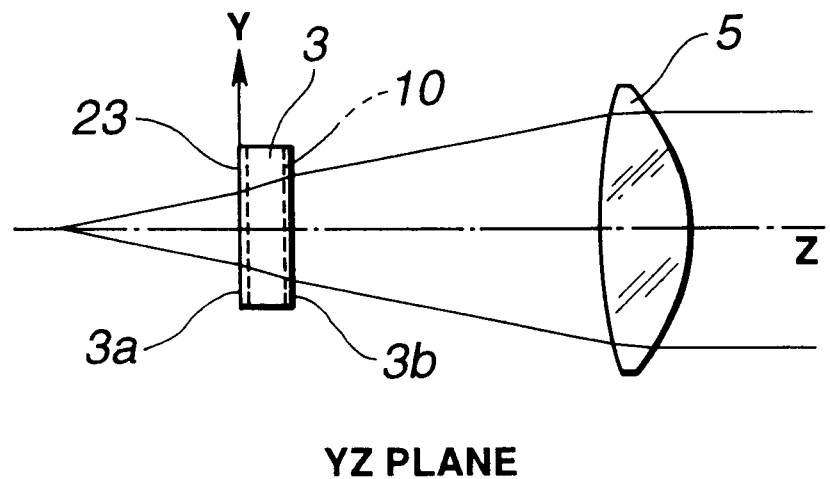

Similarly to the beam shaping element shown in FIG. 6, the beam shaping element 3 shown in FIG. 8 spreads the light beam in the XZ plane to emit the spread light beam from the radiating surface 3b, by the light beam from the semiconductor laser element 2 being transmitted through the beam shaping element 3, as shown in FIG. 8a. However, the light beam is not spread by the beam shaping element 3 in the YZ plane, as shown in FIG. 8b.

Figure 9A:
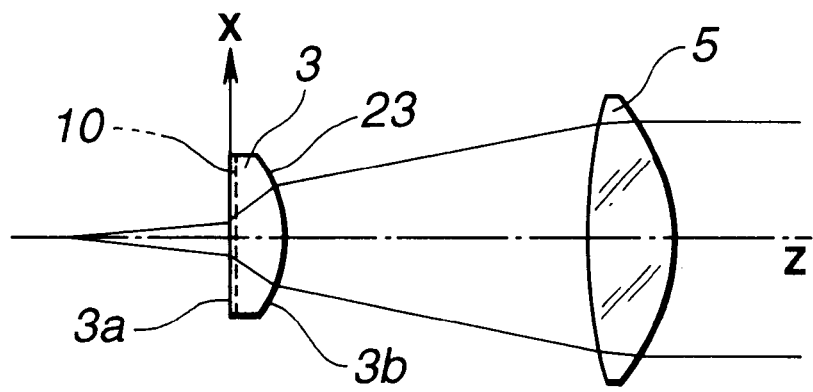
FIG. 9a is schematic side view showing, on the XZ plane, how a light beam traverses a beam shaping element according to a still another modification.
Figure 9B:
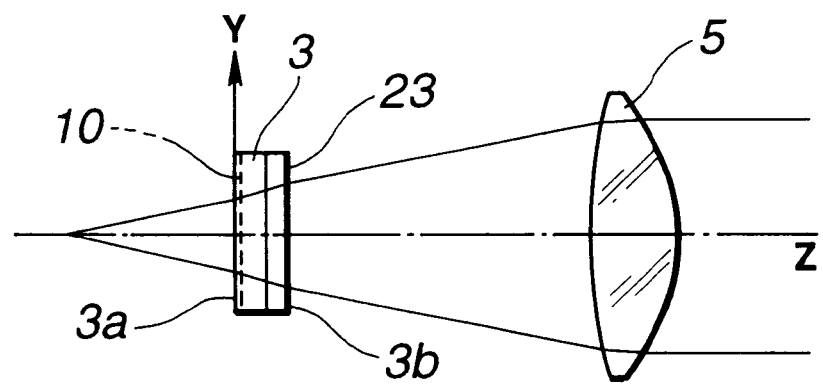
FIG. 9b is a schematic side view showing, on the YZ plane, how a light beam traverses the beam shaping element according to this modification.

For enlarging the light beam diameter in the XZ plane, the hologram pattern 10 and a cylindrical lens unit 23 may be provided on the incident surface 3a and on the radiating surface 3b of the beam shaping element 3, as shown in FIGS. 9a and 9b. This cylindrical lens unit 23 is formed as-one with the beam shaping element 3 by forming a cylindrical protrusion on the radiating surface 3b of the beam shaping element 3.

Similarly to the beam shaping element shown in FIG. 5, the beam shaping element 3 shown in FIG. 9 spreads the light beam in the XZ plane to emit the spread light beam from the radiating surface 3b, by the light beam from the semiconductor laser element 2 being transmitted through the beam shaping element 3, as shown in FIGS. 9a and 9b. However, the light beam is not spread by the beam shaping element 3 in the YZ plane, as shown in FIG. 8b.

Figure 10A:
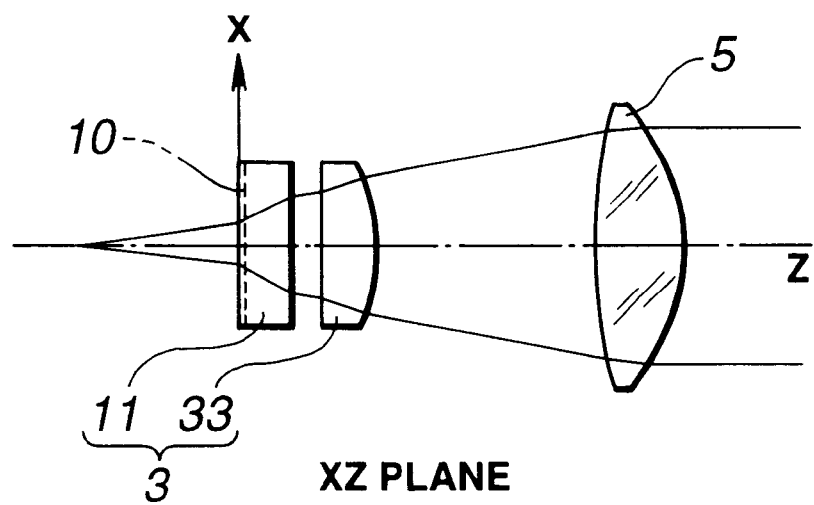
FIG. 10a is schematic side view showing, on the XZ plane, how light beam traverses a beam shaping element according to yet another modification.
Figure 10B:
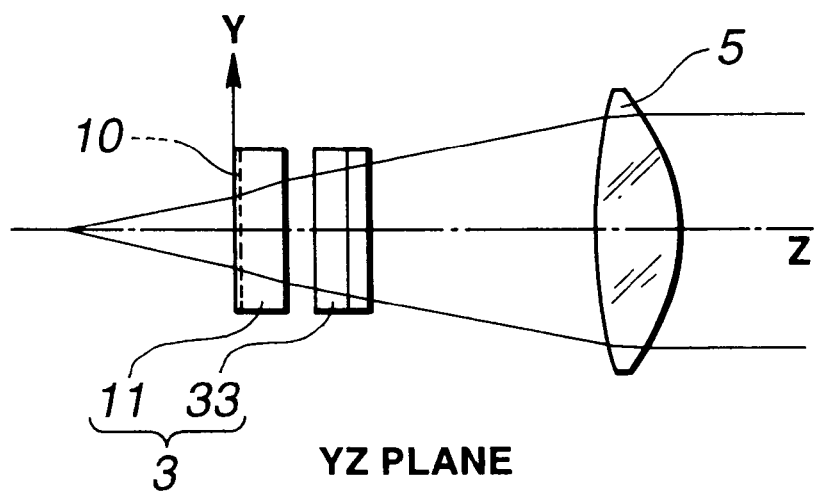
FIG. 10b is a schematic side view showing, on the YZ plane, how a light beam traverses a beam shaping element according to this modification.

Moreover, the beam shaping element 3 may be constituted by a hologram plate 11 as a flat plate-shaped first optical element having the hologram pattern 10, and a cylindrical lens 33 as a second optical element, as shown in FIGS. 10a, 10b. The first and second optical elements are formed independently of each other. In this case, the hologram plate 11 is arranged on the side of the beam shaping element 3 on which falls the light beam radiated by the semiconductor laser element 2, while the cylindrical lens 33 is arranged on the light beam radiating side of the beam shaping element 3. The hologram plate 11 has the hologram pattern formed for facing the incident surface 3a, while the cylindrical lens 33 is arranged with the cylindrical surface facing the light beam radiating surface.

Similarly to the beam shaping element shown in FIG. 6, the beam shaping element 3 shown in FIG. 10 spreads the light beam in the XZ plane to emit the spread light beam from the radiating surface 3b, by the light beam from the semiconductor laser element 2 being transmitted through the beam shaping element 3, as shown in FIGS. 10a. However, the light beam is not spread by the beam shaping element 3 in the YZ plane, as shown in FIG. 10b.

The collimator lens 5 collimates the light transmitted through the beam shaping element 3 and the beam splitter 4. On this collimator lens 5 falls the divergent light beam radiated from the semiconductor laser element 2. The light beam is collimated by the collimator lens 5 so as to be radiated towards the objective lens 7.

The objective lens 7 converges the light beam transmitted through the collimator lens 5 to the signal recording surface 6a of the recording medium 6. This objective lens 7, on which falls the light beam collimated by the collimator lens 5, converges the light beam so that a beam spot will be formed on the signal recording surface 6a of the recording medium 6.

The optical analyzer 8, on which falls the light beam reflected by the signal recording surface 6a of the recording medium 6 and transmitted through the objective lens 7, collimator lens 5 and the beam splitter 4, plane-polarizes this light beam. The light beam transmitted through this optical analyzer 8 is incident on the photodetector 9.

Figure 3:
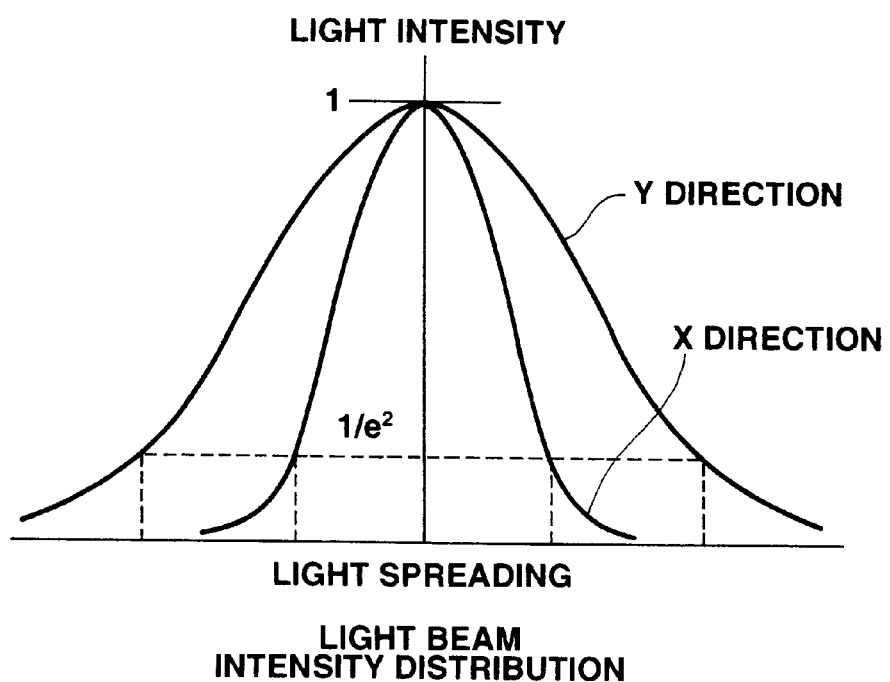
FIG. 3 illustrates light intensity distribution in the X- and Y-directions of the light beam radiated from the semiconductor laser element.

With the above-described optical pickup device 1, the light beam having the intensity distribution as shown in FIG. 3 is sent from the semiconductor laser element 2 and transmitted through the above-described optical elements so as to be converged on the signal recording surface 6a of the recording medium 6. Of the light beam radiated from the semiconductor laser element 2, the component of the light beam in the Y-direction is spread more significantly than the light beam component in the X-direction. In the optical pickup device 1 having the beam shaping element 3, the light beam exhibits significant spreading in the X-direction in the XZ plane, so that, by passing the light beam through the beam shaping element 3, as shown in FIG. 11, the size of the light beam corresponding to the intensity of the light beam L equal to $1/e^2$ can be made larger in size on the lens aperture surface 7a of the objective lens 7 than the diameter of the pupil of the aperture 7a.

Figure 11:
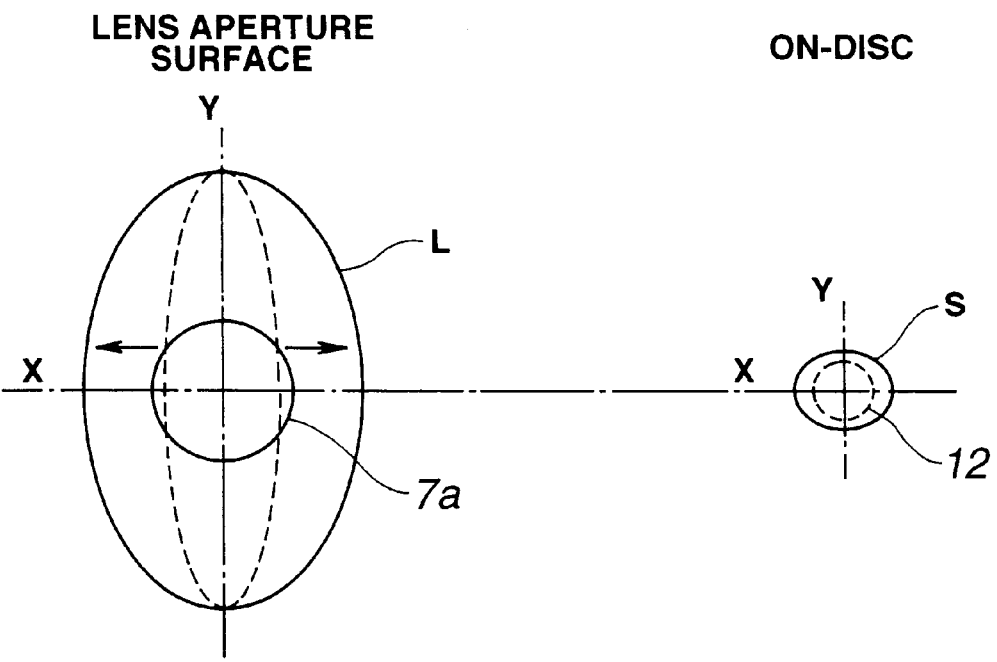
FIG. 11 is a plan view showing the state of the light beam on the lens aperture surface of an objective lens and a signal recording surface of an optical disc.

If the light beam L is converged on the signal recording surface 6a of the recording medium 6, the beam spot S as shown in FIG. 11 is formed. This beam spot S has approximately the same shape as a diffraction limit beam spot 12 determined by the wavelength of the light beam radiated from the semiconductor laser element 2 and the numerical aperture of the objective lens 7.

Figure 12:
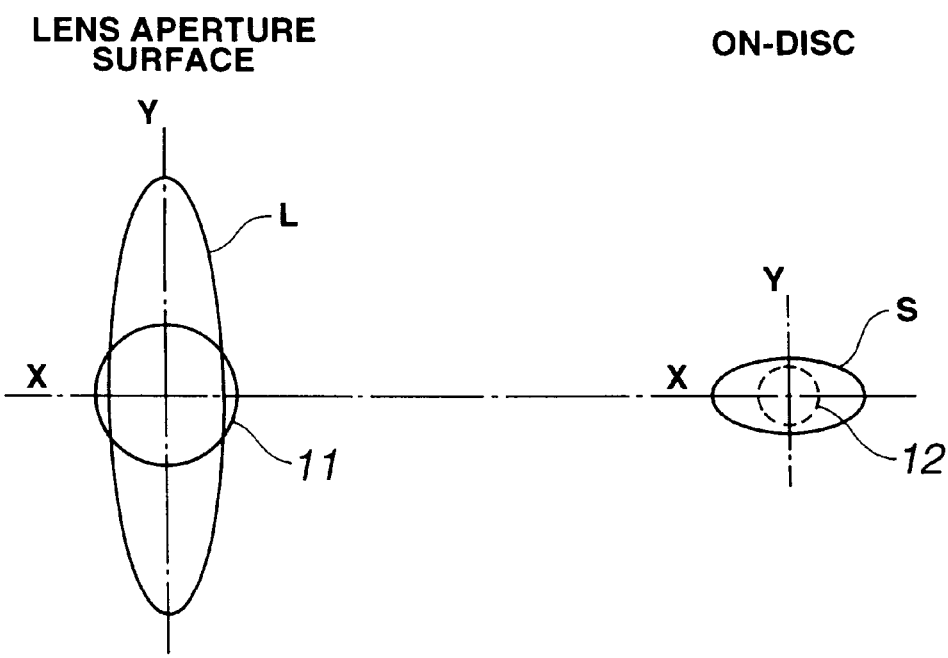
FIG. 12 is a plan view showing the state of the light beam on the lens aperture surface of an optical pickup device not having a beam shaping element and on the signal recording surface of the optical disc.

Conversely, with an optical pickup device not having the above-described beam shaping element, the size of the light beam corresponding to the intensity of the light beam L not less than $1/e^2$ as shown in FIG. 12 exhibits more significant spreading in the Y-direction than that in the X-direction on the XY plane on the lens aperture surface. If the light beam L is spread in this manner more significantly in the Y-direction than in the X-direction, the light beam L is not incident in the X-direction in the opening pupil of the lens aperture 11.

If the light beam L is condensed on the signal recording surface 6a of the recording medium 6, there is formed a beam spot S having intensity distribution as shown in FIG. 12. The beam spot S formed by the light beam L is of an elliptical shape in contradistinction from the true circular intensity distribution of the diffraction limit beam spot 12 determined by the wavelength λ of the light beam radiated from the semiconductor laser element 2 and the numerical aperture of the objective lens 7. If the beam spot formed on the signal recording surface 6a of the recording medium is elliptically-shaped, the beam spot is increased in size.

Thus, with the optical pickup device 1, a light spot of approximately true circular shape can be formed in a manner different from that formed in the prior art device, even if the light beam is elliptically-shaped and has an intensity distribution as shown in FIG. 3. In addition, a beam spot can be formed on the signal recording surface 6a of the recording medium 6 with reduced light beam aberration.

Moreover, since the beam shaping element 3 is arranged in the divergent light path, the device itself can be reduced in size. Since the light beam can be shaped by one or two optical elements, there is no necessity of shaping the light beam using a conventional anamorphic lens, thus reducing the cost.

A further example of the optical pickup device 1 is explained.

Figure 13:
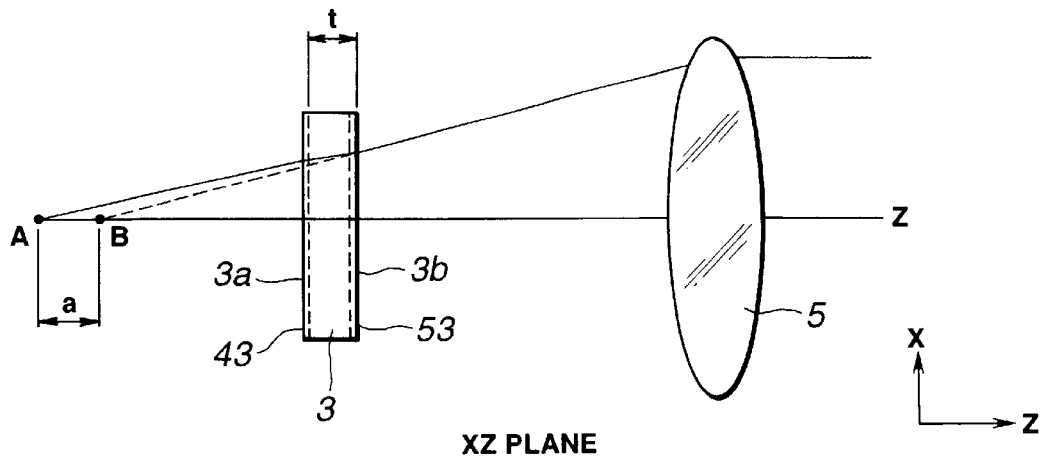
FIG. 13 is a schematic side view for illustrating the spherical aberration produced on the XZ plane by the light beam traversing the beam shaping element.
Figure 14:
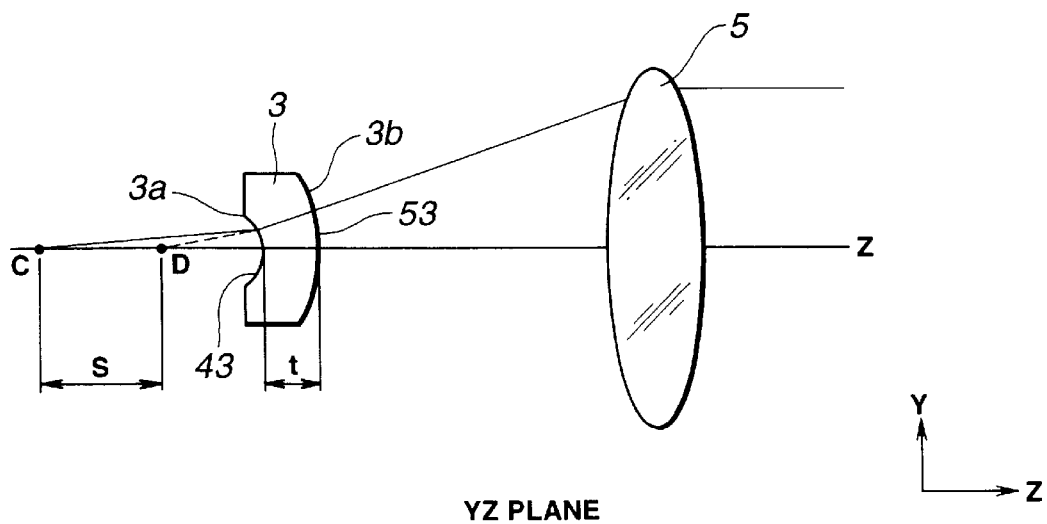
FIG. 14 is a schematic side view for illustrating the spherical aberration produced on the YZ plane by the light beam traversing the beam shaping element.

Specifically, the beam shaping element 3 is not limited to the above-described embodiment in which the hologram pattern 10 is formed on at least one of the incident surface 3a and the radiating surface 3b of the beam shaping element 3. That is, the beam shaping element may be formed as-one with a first cylindrical lens unit 43 and a second cylindrical lens unit 53 on the incident surface 3a and the radiating surface 3b of the light beam radiated from the semiconductor laser element 2, as shown in FIGS. 13 and 14. The beam shaping element 3, thus having the non-spherical first and second cylindrical lens units 43, 53 on both sides of the incident surface 3a and the radiating surface 3b of the light beam, is easy to manufacture because there is no necessity of forming complicated hologram patterns.

Meanwhile, the first cylindrical lens unit 43 is formed for being swollen out from the incident surface 3a towards the radiating surface 3b. Specifically, the first cylindrical lens unit 43 is formed as-one with the beam shaping element 3 by forming a cylindrically-shaped swollen-out portion on the incident surface 3a, radiating surface 3b of the beam shaping element 3. On the other hand, the second cylindrical lens unit 53 is formed as-one with the beam shaping element 3 by forming a cylindrically-shaped swollen-out portion on the radiating surface 3b of the beam shaping element 3.

In the above-described embodiment, the lens operation is accorded in the XZ plane to the beam shaping element 3 for increasing the spreading of the light beam whilst the lens operation is not accorded in the YZ direction. Alternatively, the lens operation may be accorded in the YZ plane for increasing the beam spreading in the YZ plane, without according the lens effect in the XZ plane, as shown in FIGS. 13 and 14.

That is, the beam shaping element 3 is designed so as to have the lens operation in the XZ plane shown in FIG. 13 and so as not to have the lens operation in the YZ plane shown in FIG. 14. If the beam shaping element 3 has a thickness t, a plan-parallel plate with a thickness equal to t is equivalently arranged in the XZ plane. Meanwhile, the collimator lens 5 is designed to correct the spherical aberration generated by the beam shaping element 3 in the XZ plane. Thus, the light beam which has traversed the collimator lens 5 in the XZ plane is freed of aberration even if the light beam is subjected to spherical aberration by being passed through the beam shaping element 3.

It should be noted that the collimator lens 5 is designed to correct the spherical aberration generated by the beam splitter 4 as well if such beam splitter 4 is arranged between the collimator lens 5 and the beam shaping element 3 as shown in FIG. 1.

In the XZ plane, the light beam traversing the beam shaping element 3 as the equivalent plan-parallel plate has an offset component due to a pre-set aberration of the plan-parallel plate. This offset component α is the distance between the radiating point A of the light beam and the point B of intersection of a line of extension of an outer contour line of the light beam which has traversed the plan-parallel plate in the XZ plane and the optical axis.

On the other hand, this beam shaping element 3 increases the spreading of the light beam in the YZ plane, due to the lens operation of the lens 3, as shown in FIG. 14. The light beam which has traversed the collimator lens 5 needs to be free of spherical aberration in the YZ plane as well. As a condition in this case, the separation S between the object point A and an image point D needs to be equal to an error ascribable to aberration of the plan-parallel plate in the above-mentioned XZ plane, that is an offset component a between the object point A and the image point D, for the thickness t of the beam shaping element 3. If the refractive index of the beam shaping element 3 is n, the condition for the light beam to be a collimated light beam after traversing the collimator lens 5 is $$S = t(1 - 1/n) \quad (1)$$

as above. That is, if the separation S between the object point A and the image point D is equal to the offset component α ascribable to aberration, the light beam is collimated after traversing the collimator lens 5. In the YZ plane, the incident surface 3a and/or the radiating surface 3b of the beam shaping element 3 is preferably non-spherical. For example, the beam shaping element 3 is preferably a non-spherical cylindrical lens. In this case, the light beam which has traversed the beam shaping element 3 and the collimator lens 5 is radiated with suppressed spherical aberration in the YZ plane and in the XZ plane.

Figure 15:
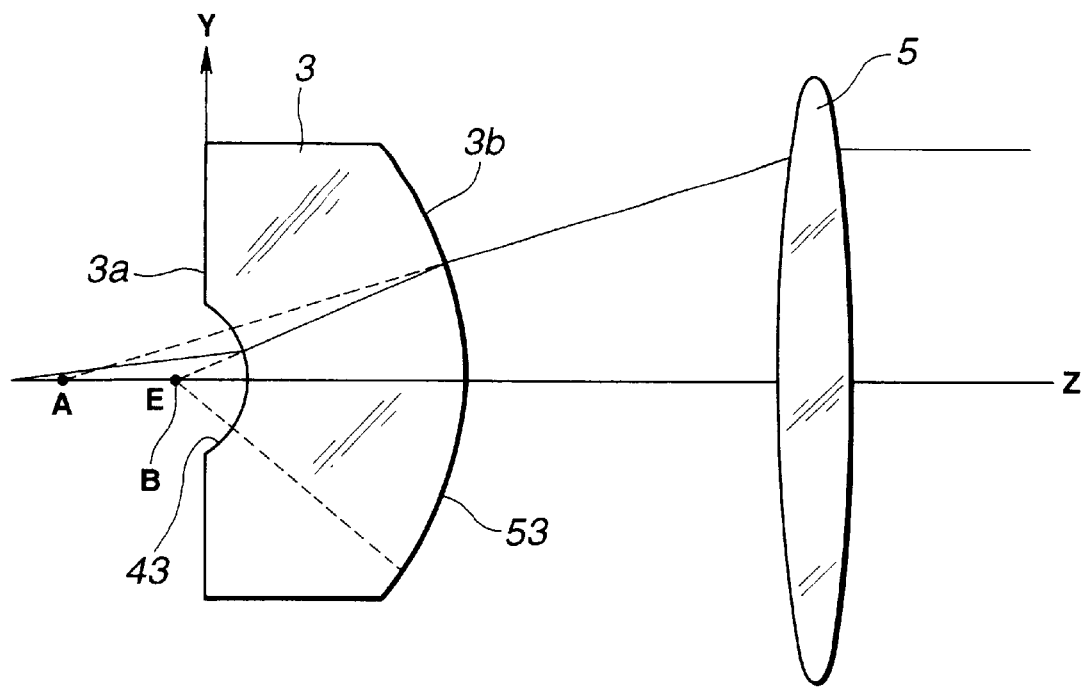
FIG. 15 is a side view showing on the YZ plane an example of using a beam shaping element having both surfaces as columnar lenses and having coincident radii of curvature of the incident surface and the radiating surface.

In place of at least one of the incident surface 3a and the radiating surface 3b of the beam shaping element 3 being non-spherical in the YZ plane as described above, both the incident surface 3a and the radiating surface 3b of the beam shaping element 3 may be spherical. With the beam shaping element 3, having both surfaces as the spherical surfaces, it is desirable that not only the condition of the equation (1) is met, but also that the center of curvature of the incident surface 3a is coincident with that of the radiating surface 3b at the same point E, as shown in FIG. 15. In addition, with the beam shaping element 3, shown in FIG. 15, having the thickness t in the Z-direction, refractive index n and the separation S between the object point A and the image point B, the above equation (1) is desirably met. This enables the light beam having passed through the collimator lens 5 to be collimated light free of aberration.

Moreover, in order to minimize the spherical aberration of the light beam having passed through the collimator lens 5, not only is the above equation (1) to be satisfied, but also is the center of curvature of the incident surface to be coincident in the XZ direction with that of the radiating surface. For minimizing the spherical aberration, the separation between the center position of the incident surface and that of the radiating surface of the beam shaping element 3 is preferably not larger than 3% of the lens thickness t.

Figure 16:
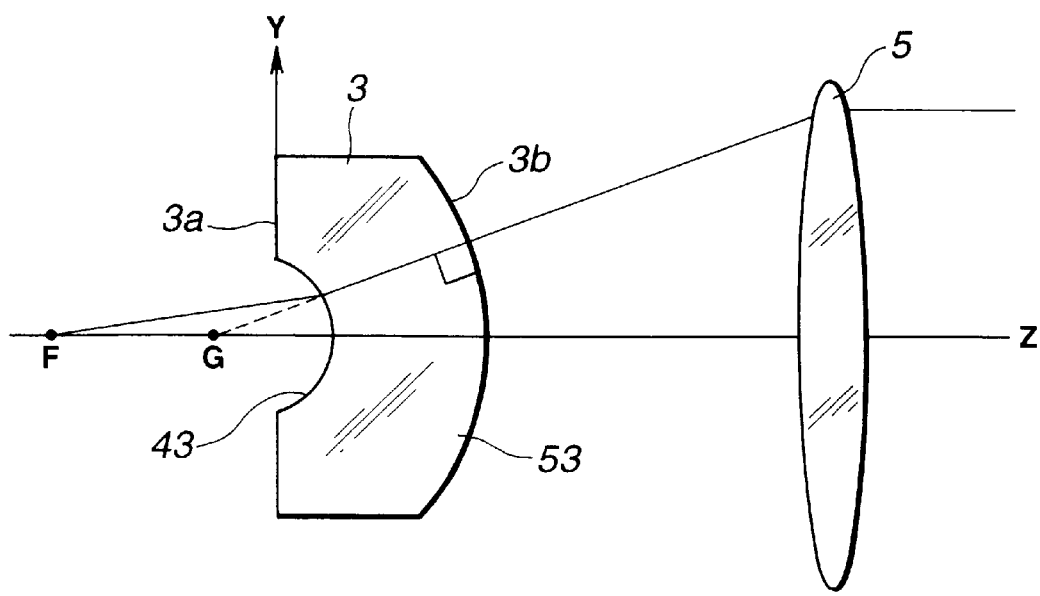
FIG. 16 is a side view showing on the YZ plane an example of using a beam shaping element having both surfaces as columnar lenses and adapted for freeing the light beam traversing the element of aberration.

Meanwhile, if an object point F and an image point G of the optical system are aplanatic points of the incident surface 3a and the center of curvature of the radiating surface 3b is coincident with the aplanatic points, the beam shaping element 3 represents a lens free of aberration, as shown in FIG. 16. However, the collimator lens 5, on which falls the light beam having traversed the beam shaping element 3, is designed as having spherical aberration caused by the beam shaping element 3 having a thickness t. Therefore, the light beam, having traversed the collimator lens 5, is subjected to spherical aberration on traversing the collimator lens 5, even if the light beam having traversed the beam shaping element 3 is free of aberration. Thus, the beam shaping element 3 shown in FIG. 16 is designed so that the light beam passed therethrough undergoes pre-set spherical aberration associated with the thickness t.

An embodiment in which the incident surface 3a or the radiating surface 3b of the beam shaping element 3 represents a non-spherical cylindrical lens or the incident surface 3a and the radiating surface 3b represent non-spherical cylindrical lenses, is hereinafter explained.

Figure 17A:
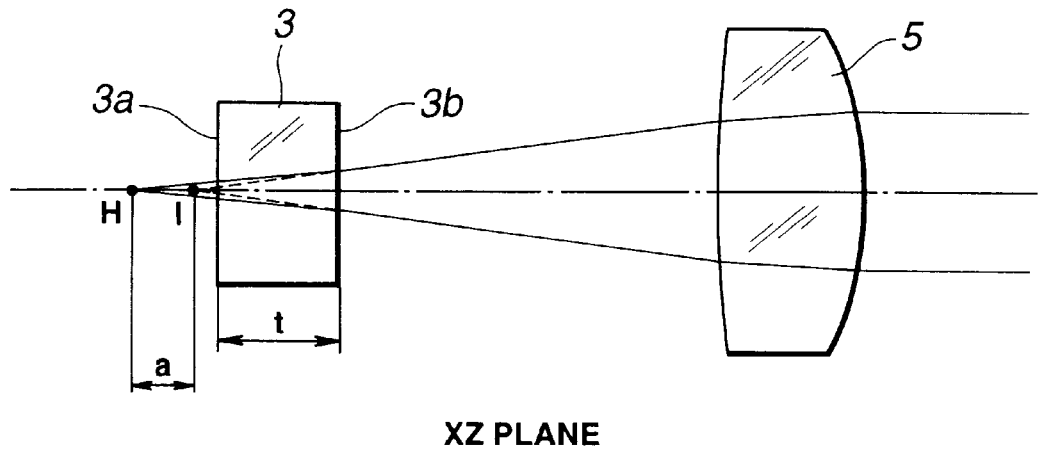
FIG. 17a a schematic side view showing, on the XZ plane, an example of using a beam shaping element in the form of a cylindrical lens at least one surface of which is a non-spherical surface in the YZ plane, and FIG. 17b a schematic side view showing, on the YZ plane, an example of using a beam shaping element in the form of a cylindrical lens at least one surface of which is a non-spherical surface in the XZ plane.
Figure 17B:
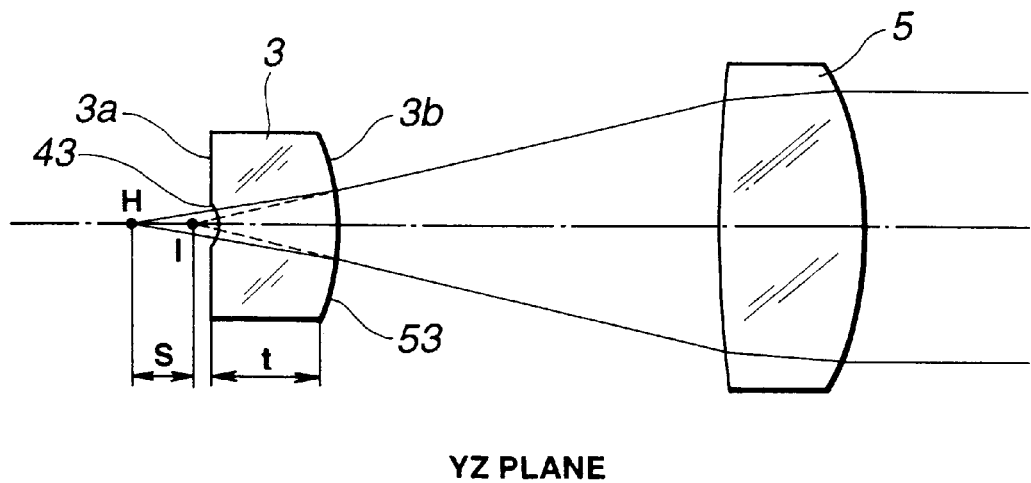

The beam shaping element 3 represents a cylindrical lens having the radiating surface 3b as a cylindrical portion 53 in the YZ plane, as shown in FIGS. 17a and 17b. In this case, the beam shaping element 3 has a multiplication factor of approximately 1.7, a refractive index of approximately 1.86, a separation between the radiating surface 3b and the incident surface 3a of approximately 2 mm, a radius of curvature of the incident surface 3a of approximately 2 mm, a radius of curvature of the radiating surface 3b of approximately 6.07 mm and a thickness t of approximately 3 mm. At this time, the separation S between an object H and an image point I in FIG. 17b is approximately 1.3857 mm.

On the other hand, an offset component α caused by the aberration in case the beam shaping element 3 is regarded as a plan-parallel plate is 3×(1−1/1.86)=1.3857 mm, as found from the equation (1). Thus, with the present beam shaping element 3, the separation S between the object point H and the image point I is of the same value as the offset component α caused by the aberration proper to the plan-parallel plate. Therefore, the present beam shaping element 3 satisfies the above equation (1) not only in the YZ plane but also in the XZ plane.

It is noted that, with the beam shaping element 3, the separation between the center of curvature of the incident surface 3a and that of the radiating surface 3b in the YZ plane is approximately 1.98 mm which is of the order of 66% of the thickness t.

The light beam having traversed the beam shaping element 3 and the collimator lens 5 has the wavefront aberration of approximately 0.11 λ and thus undergoes spherical aberration. If the beam shaping element 3 is of a non-spherical shape, without changing the curvature of the radiating surface 3b, the beam shaping element 3 has the wavefront aberration of approximately 0.03 λ thus enabling reduction in the spherical aberration.

The beam shaping element 3 can be designed by setting four of six conditions, namely the multiplication factor, refractive index, separation between the object point and the incident surface 3a, radius of curvature of the incident surface 3a, radius of curvature of the radiating surface 3b and the thickness t, as described above. With this beam shaping element 3, the aberration proper to the traversing light beam can be set to pre-set value by having at least one of the incident surface 3a and the radiating surface 3b formed as a non-spherical surface.

An embodiment in which both the incident surface 3a and the radiating surface 3b of the beam shaping element 3 represent spherically-shaped cylindrical lenses in the YZ plane, as shown in FIG. 18, is hereinafter explained.

Figure 18A:
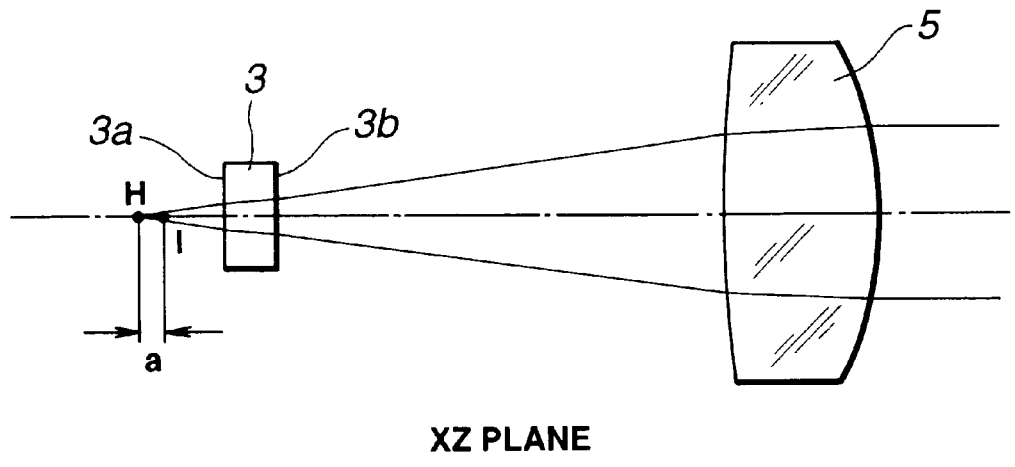
FIG. 18a is a schematic side view showing, on the XZ plane, an example of using a beam shaping element in the form of a cylindrical lens both surfaces of which are non-spherical surfaces in the YZ plane.
Figure 18B:
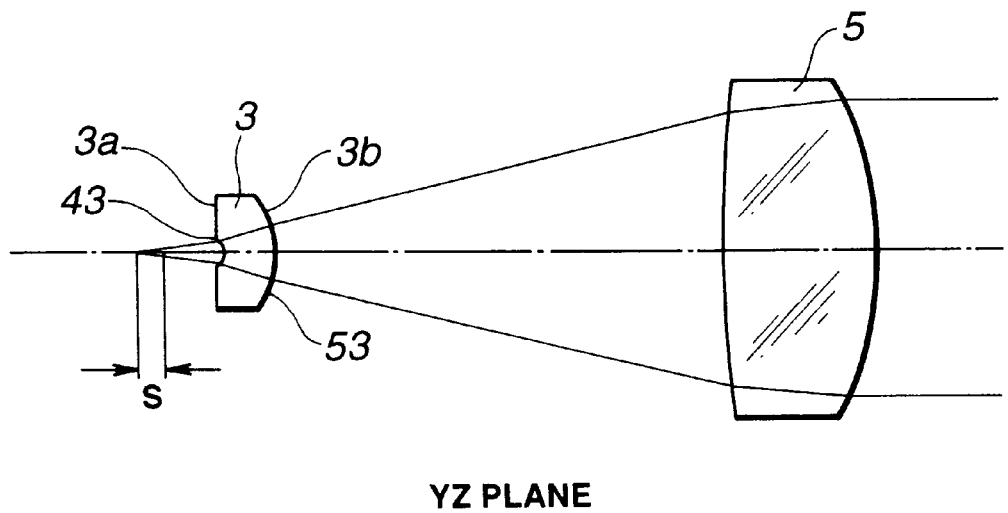
FIG. 18b is a schematic side view showing, on the YZ plane, an example of using a beam shaping element in the form of a cylindrical lens both surfaces of which are non-spherical surfaces in the XZ plane.

If the beam shaping element 3 is a cylindrical lens, having its both surfaces spherically-shaped in the YZ plane, as shown in FIGS. 18a, 18b, the multiplication factor, refractive index, separation between the object point (light-emitting point) H and the incident surface 3a, radius of curvature of the incident surface 3a, radius of curvature of the radiating surface 3b and the thickness t, are approximately 1.7, approximately 1.86, approximately 2 mm, approximately 0.6 mm, approximately 1.78 mm and approximately 2 mm, respectively. In this case, the separation S between the object point H and the image point I in FIG. 18b is approximately 0.5543 mm. On the other hand, the offset component α due to the aberration proper to a plan-parallel plate when the beam shaping element 3 in FIG. 18a is regarded as being a plan-parallel plate in the XZ plane is of the order of 3×(1−1/1.86)=0.5543 mm, as found from the equation (1). Therefore, with this beam shaping element 3, the separation S between the object point H and the image point I is equal in magnitude to the offset component α ascribable to aberration. Therefore, this beam shaping element 3 satisfies the above equation (1) both in the YZ plane and in the XZ plane.

It is noted that, with this beam shaping element 3, the separation between the center of curvature of the incident surface 3a and that of the radiating surface 3b is approximately 0.02 mm which is of the order of 1.7% of the thickness t.

The light beam having traversed the beam shaping element 3 and the collimator lens 5 is of the wavefront aberration of approximately 0.002 λ which is of a magnitude smaller than the light beam having traversed the beam shaping element 3 of the first embodiment.

The beam shaping element 3 can be designed so as to have the aberration smaller than that of the above-described embodiment of the beam shaping element 3 by setting three of six conditions, namely the multiplication factor, refractive index, separation between the object point and the incident surface 3a, radius of curvature of the incident surface 3a, radius of curvature of the radiating surface 3b and the thickness t, as described above.

Although the beam shaping element in the optical pickup device 1 of the present invention is arranged upstream of the beam splitter 4 as described above, it may, of course, be arranged in the divergent optical path upstream of the collimator lens 5.

In the above-described embodiment, the optical pickup device 1 has the beam shaping element 3 and the collimator lens 5. However, the optical pickup device may also not be provided with the collimator lens 5.

Although the above-described optical pickup device 1 is of the type of directing the light beam having traversed the collimator lens 5 to the objective lens 7, with the aperture diameter of the light beam having traversed the collimator lens 5 as the opening pupil diameter, the aperture determining the opening pupil of the light beam having traversed the collimator lens 5 may, of course, be arranged upstream of the objective lens 7.

Although the above-described optical pickup device 1 is of the type of converging the light beam on the signal recording surface 6a of the optical disc 6, the present invention may, of course, be applied to an optical pickup device adapted for recording/reproducing signals by converging the light beam on a tape-shaped or card-shaped recording medium.

INDUSTRIAL APPLICABILITY

With the optical pickup device according to the present invention, as described above, the incident light beam can be shaped since the beam shaping element for shaping the light beam is arranged on the divergent optical path of the light beam. Therefore, with the present optical pickup device, the beam spot converged on the signal recording surface of the recording medium is not elliptically-shaped but is of the substantially true circular shape for recording/reproducing information signals to high density. In addition, with the present optical pickup device, the optical path length can be shortened to reduce the size of the device since the beam can be shaped solely on arranging the beam shaping element on the divergent optical path.

What is claimed is:

1. An optical pickup device comprising:

a semiconductor laser element;

an objective lens for converging a light beam radiated from said semiconductor laser element; and beam shaping means arranged in a divergent optical path of a light beam radiated from said semiconductor laser element, wherein said beam shaping means includes an optical element, the incident surface and the radiating surface of which are formed as spherical surfaces, and wherein said optical element satisfies $s=t(1-1/n)$ where t, n are a thickness and a refractive index of the optical element, respectively, and s is a separation between an object point and an image point, the distance between the centers of curvature of the incident and radiating surfaces being not larger than 3% of the thickness of the optical element.

2. An optical pickup device comprising:

a semiconductor laser element;

a collimator lens for collimating a light beam radiated from said semiconductor laser element;

an objective lens for converging the collimated light from said collimator lens; and beam shaping means arranged on a divergent optical path of a light beam radiated from said semiconductor laser element on a light path between said semiconductor laser element and the collimator lens, wherein said beam shaping means includes an optical element, the incident surface and the radiating surface of which are formed as spherical surfaces, and wherein said optical element satisfies $s=t(1-1/n)$ where t, n are a thickness and a refractive index of the optical element, respectively, and s is a separation between an object point and an image point, the distance between the centers of curvature of the incident and radiating surfaces being not larger than 3% of the thickness of the optical element.

* * * * *